(12) United States Patent
Teratani et al.

(10) Patent No.: US 6,336,487 B1
(45) Date of Patent: Jan. 8, 2002

(54) PNEUMATIC TIRE, METHOD OF MANUFACTURING A PNEUMATIC TIRE, RUBBER COMPOSITION AND VULCANIZED RUBBER COMPOSITION

(75) Inventors: Hiroyuki Teratani, Saitama-ken; Tomohisa Nishikawa; Yuji Yamaguchi, both of Tokyo, all of (JP)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 08/952,503

(22) PCT Filed: Mar. 18, 1997

(86) PCT No.: PCT/JP97/00873

§ 371 Date: Nov. 17, 1997

§ 102(e) Date: Nov. 17, 1997

(87) PCT Pub. No.: WO97/34776

PCT Pub. Date: Sep. 25, 1997

(30) Foreign Application Priority Data

| Mar. 18, 1996 | (JP) | 8-061249 |
| Jun. 4, 1996 | (JP) | 8-141745 |
| Aug. 7, 1996 | (JP) | 8-208105 |

(51) Int. Cl.⁷ .............................. B60C 1/00; B60C 11/00
(52) U.S. Cl. ................. 152/209.7; 156/123; 156/130.5; 428/314.2; 428/314.8; 428/313.5
(58) Field of Search .......................... 152/209.7, 209.4; 156/123, 130.5, 114; 521/99, 131, 150; 428/308.4, 313.5, 314.2, 314.8, 316.6, 327

(56) References Cited

U.S. PATENT DOCUMENTS 4,249,588 A * 2/1981 Egan ........................ 152/209.7
5,342,900 A * 8/1994 Wolpers et al. ........... 525/329.3
5,351,734 A * 10/1994 Mouri et al. .............. 152/209.4
5,753,365 A * 5/1998 Morimoto et al. .......... 428/357
5,776,991 A * 7/1998 Teratani ........................ 521/99

FOREIGN PATENT DOCUMENTS

| EP | 517538 | * 12/1992 | ............. 152/209.7 |
| EP | 734886 | * 10/1996 | |
| JP | 1-178535 | 7/1989 | |
| JP | 4-38207 | 2/1992 | |
| JP | 4-110212 | 4/1992 | |
| JP | 4-362403 | 12/1992 | |

OTHER PUBLICATIONS

Derwent abstract for JP 04–368,205, Dec. 1992.*
Derwent abstract for JP 04–110,212, Apr. 1992.*

* cited by examiner

Primary Examiner—Geoffrey L. Knable
(74) Attorney, Agent, or Firm—Suhgrue Mion, PLLC

(57) ABSTRACT

A pneumatic tire which is used for a vehicle and obtained after a rubber material is formed by vulcanization. A cap portion (12A), which is an upper layer of a tread and directly contacts the road surface, is a foam rubber which includes innumerable elongated closed cells (24). The outer portion of the elongated closed cell (24) is coated by a resinous protective layer (26). During the vulcanization process of the tire, a resin whose viscosity is lower than that of a rubber matrix and a blowing agent which generates gas are kneaded with a rubber material so as to obtain a rubber composition. The rubber composition is formed in the shape of a band and adhered to a crown portion of a raw tire casing. The resin is melted by the heat of vulcanization and the viscosity of the resin is lower than that of the rubber matrix. The gas generated in the rubber moves toward and concentrates at the inner side of the resin. Accordingly, an elongated closed cell (24) whose outer portion is provided with the resinous protective layer (26) is formed.

30 Claims, 9 Drawing Sheets

FIG. 3
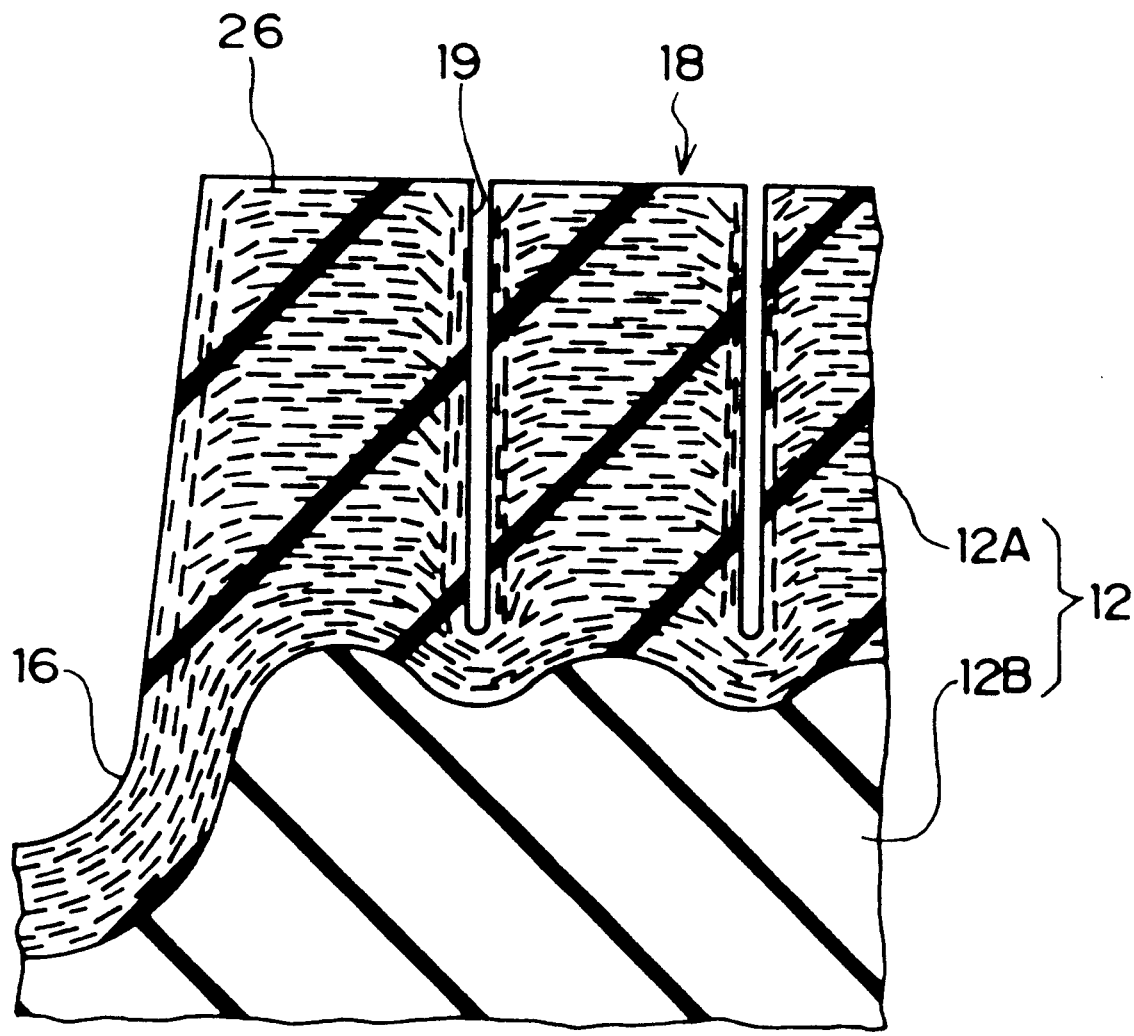
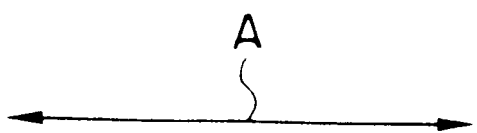

PNEUMATIC TIRE, METHOD OF MANUFACTURING A PNEUMATIC TIRE, RUBBER COMPOSITION AND VULCANIZED RUBBER COMPOSITION

FIELD OF THE INVENTION

The present invention relates to a pneumatic tire which is able to obtain a large coefficient of friction on ice, to a method of manufacturing the pneumatic tire which is able to obtain a large coefficient of friction on ice, and to a rubber composition and a vulcanized rubber composition which are able to obtain a large coefficient of friction on ice.

BACKGROUND OF THE INVENTION

A studless tire has been proposed in which a foam rubber is used for a tread and in which running ability on ice is improved by removing water existing between an icy surface and the ground contact surface of the tread.

Further, in the field of this type of tire, a method of forming closed cells such as a foam rubber and a method of forming microscopic grooves on the surface of a rubber are known as a method for improving coefficient of friction on ice.

As a method of forming microscopic grooves on the surface of a rubber, JP-A No. 4-38207 discloses a foam rubber having short fibers. However, the disclosed fibers are likely to be curled by heat contraction during vulcanization, and as the fibers are pressed into the groove portions, i.e., siping portions, of a mold, the fibers tend to bend in the tread rubber.

As a result, even if the tread wears due to the running of a vehicle, fibers which are not substantially parallel to the wearing surface of the tread do not easily fall out from the rubber. The microscopic grooves, which were intended in the first place, cannot be efficiently formed on the surface of the rubber so that the coefficient of friction on ice is not sufficiently improved. Moreover, the microscopic grooves may be broken in a case in which the load applied to the tire is great.

Moreover, JP-A No. 4-110212 discloses the structure of a pneumatic tire in which tubular fibers are dispersed on a tread rubber and in which water existing between the icy surface and the ground contact surface of the tread is drained by tubular portions of the fibers. However, when the fibers are kneaded with the rubber, the fibers may be crushed due to the pressure, the flowing of the rubber, the temperature, or the like at the time of mixing the rubber. Thus, in actuality, the tubular shape of fibers cannot be maintained, and insufficient drainability may occur.

DISCLOSURE OF THE INVENTION

The present invention was developed in light of the drawbacks generated from the above-described conventional arts, and the object thereof is to provide a pneumatic tire, a method of manufacturing the pneumatic tire, a rubber composition, and a vulcanized rubber composition having excellent drainability of the water membrane formed between an icy surface and a tread of the tire and an increased coefficient of friction on the icy surface.

A first aspect of the present invention is a pneumatic tire in which a belt layer and a tread rubber are disposed at an outer circumference of a crown portion of a carcass layer which extends over a pair of bead cores and is formed in a toroidal shape, wherein: the tread rubber includes an elongated closed cell coated by a protective layer formed by a resin. As a result, when the tread rubber wears due to the running of a vehicle, convex portions formed by elongated closed cells are formed on the ground contact surface. The concave portions serve as draining passages and drain the water on the ground contact surface to provide an increased coefficient of friction on an icy surface. Further, since crushing of the concave portions is prevented by resinous protective layers, drainability is maintained even at the time of a high load.

In the second aspect of the present invention, a raw tread rubber includes a blowing agent, which generates gas during vulcanization of a tire, and an elongated resin, which is melted or softened during vulcanization of the tire so that the viscosity of the elongated resin is lower than the viscosity of a rubber matrix. The raw tread rubber is adhered to a crown portion of a raw tire casing. Thereafter, the raw tire casing, to which said raw tread rubber is adhered, is formed by vulcanization in a predetermined mold by means of heating and pressurizing.

During vulcanization, until the time when the tread rubber reaches the maximum vulcanizing temperature, the viscosity of the rubber matrix increases due to cross-linking. The rubber matrix described herein indicates a rubber portion other than the elongated resin. The melted elongated resin forms a phase whose viscosity is greatly lowered in the rubber matrix. On the other hand, a blowing agent begins to react, and gas is diffused within the rubber matrix and distributed between the phase of the elongated resin and the phase of the rubber matrix.

At this time, the gas is concentrated on the phase of an elongated resin whose viscosity is relatively lower than that of the rubber matrix. Accordingly, the phase of the elongated resin becomes hollow, and the elongated closed cell whose outer circumferential portion has a protective layer formed by the resin is formed within the tread rubber.

The third aspect of the present invention includes at least an elongated resin and a blowing agent which generates gas during vulcanization of a tire. The viscosity of the elongated resin is lower than the viscosity of the rubber matrix until the time when the rubber composition reaches the maximum vulcanizing temperature of a tread rubber. As a result, when the rubber composition is vulcanized, until the time when the rubber composition reaches the maximum vulcanizing temperature, the viscosity of the elongated resin is lower than that of the rubber matrix. At the same time, the gas is generated by the blowing agent. As the portion of the gas is concentrated on the interior of the elongated resin whose viscosity is lowered, the elongated closed cell whose outer circumferential portion has a protective layer formed by the resin is formed.

In this case, the rubber composition includes the elongated resin whose viscosity is lower than that of the rubber matrix until the time when the rubber composition reaches the maximum vulcanizing temperature of the tread portion and the blowing agent which generates gas during vulcanization. The vulcanized rubber composition is obtained by vulcanizing the rubber composition. The vulcanized rubber composition includes an elongated closed cell whose outer portion is reinforced by a protective layer formed by the resin. If 10% or more of the overall foaming volume of the rubber is occupied by foaming of the elongated closed cells, when the surface of a tread wears, concave portions formed by the elongated closed cells are formed on the worn surface and serve as draining passages. Because water on the ground contact surface is drained by the concave portions, the coefficient of friction on the icy surface improves, and it is difficult for the tire to slip against the icy surface. Moreover, since crushing of the concave portions is prevented by the resinous protective layers, drainability is maintained even at the time of a high load.

BRIEF DESCRIPTION OF THE DRAWINGS

FIG. 3 is an enlarged cross-sectional view of a block.

PREFERRED EMBODIMENTS OF THE PRESENT INVENTION

The present invention will be described in detail in accordance with the accompanying drawings.

An embodiment of the present invention will be explained in accordance with FIGS. 1 through 9.

Figure 1:
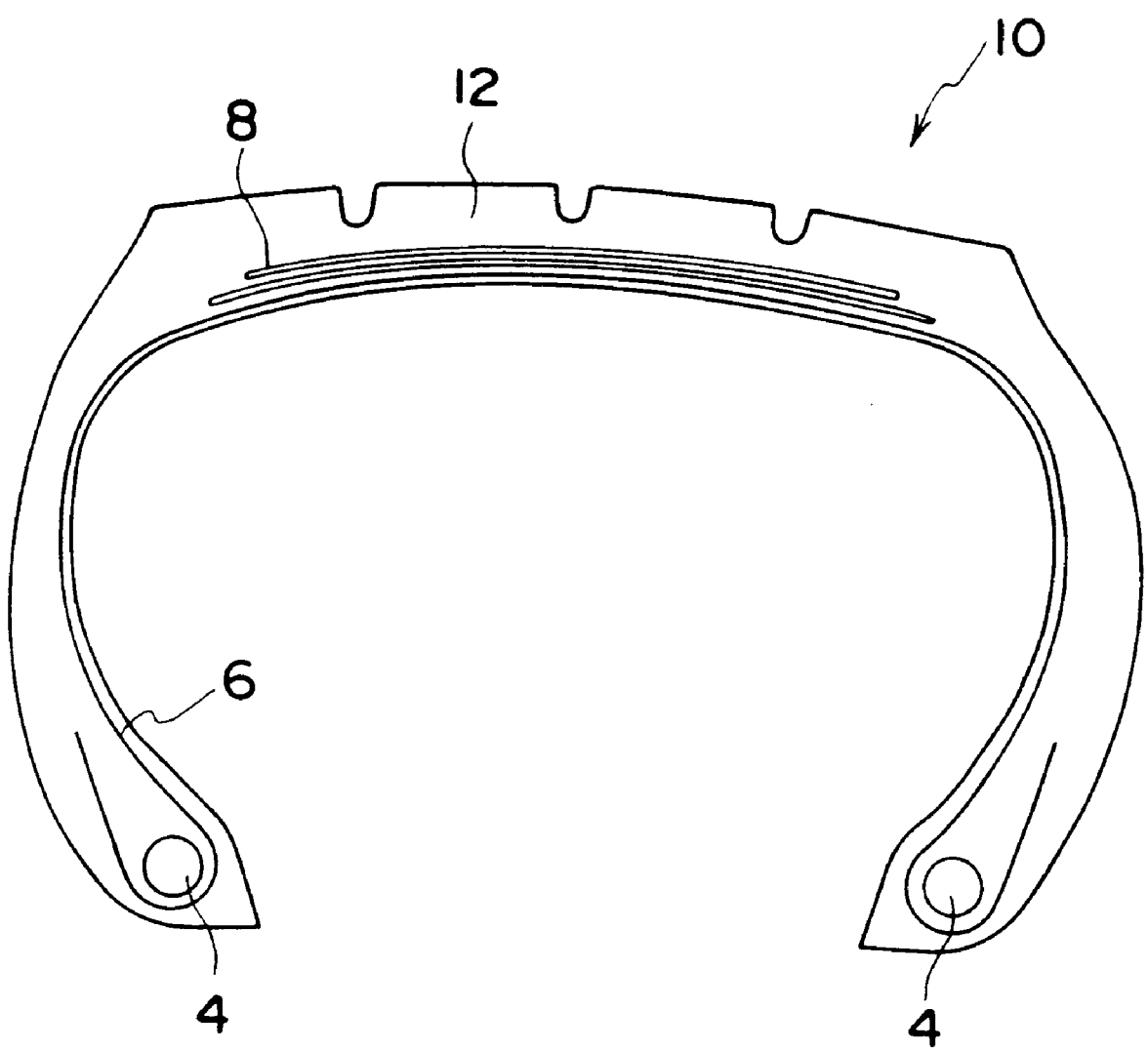
FIG. 1 is a cross-sectional view of a pneumatic tire to which the present invention is applied.

As illustrated in FIG. 1, a pneumatic tire (size: 185/70R13) 10 of the present embodiment is a radial-structured pneumatic tire in which a belt 8 serving as a reinforcing layer and a tread 12 are disposed at an outer circumference of a crown portion of a carcass 6 which extends over a pair of bead cores 4 and is formed in a toroidal shape. Since the internal structure other than the tread 12 is the same as that of an ordinary radial tire, the description thereof is omitted.

Figure 2:
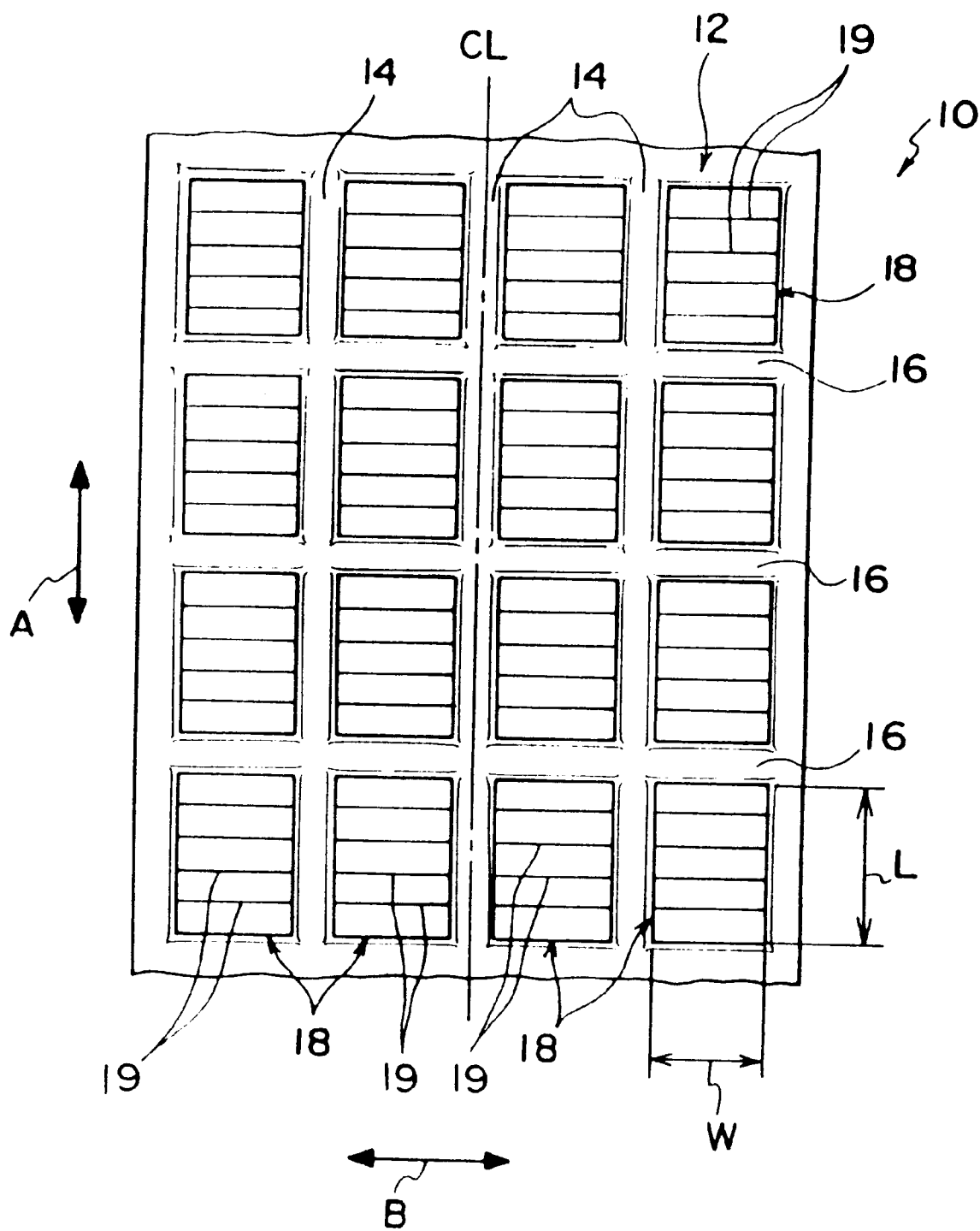
FIG. 2 is a plan view of a tread of the pneumatic tire.

As shown in FIG. 2, a plurality of blocks 18 are formed on the tread 12 by a plurality of circumferential direction grooves 14 and a plurality of lateral grooves 16 which intersect with the circumferential direction grooves 14. Further, in order to enhance braking ability and traction ability on ice, sipings 19 which extend along the transverse direction of the tire are formed on the block 18.

As illustrated in FIG. 3, the tread 12 is formed by a cap portion 12A, which is an upper layer and directly contacts the road surface, and a base portion 12B, which is a lower layer and is disposed in a vicinity of the tire inner side of the cap portion 12A, so as to form a so-called cap/base structure.

Figure 4:
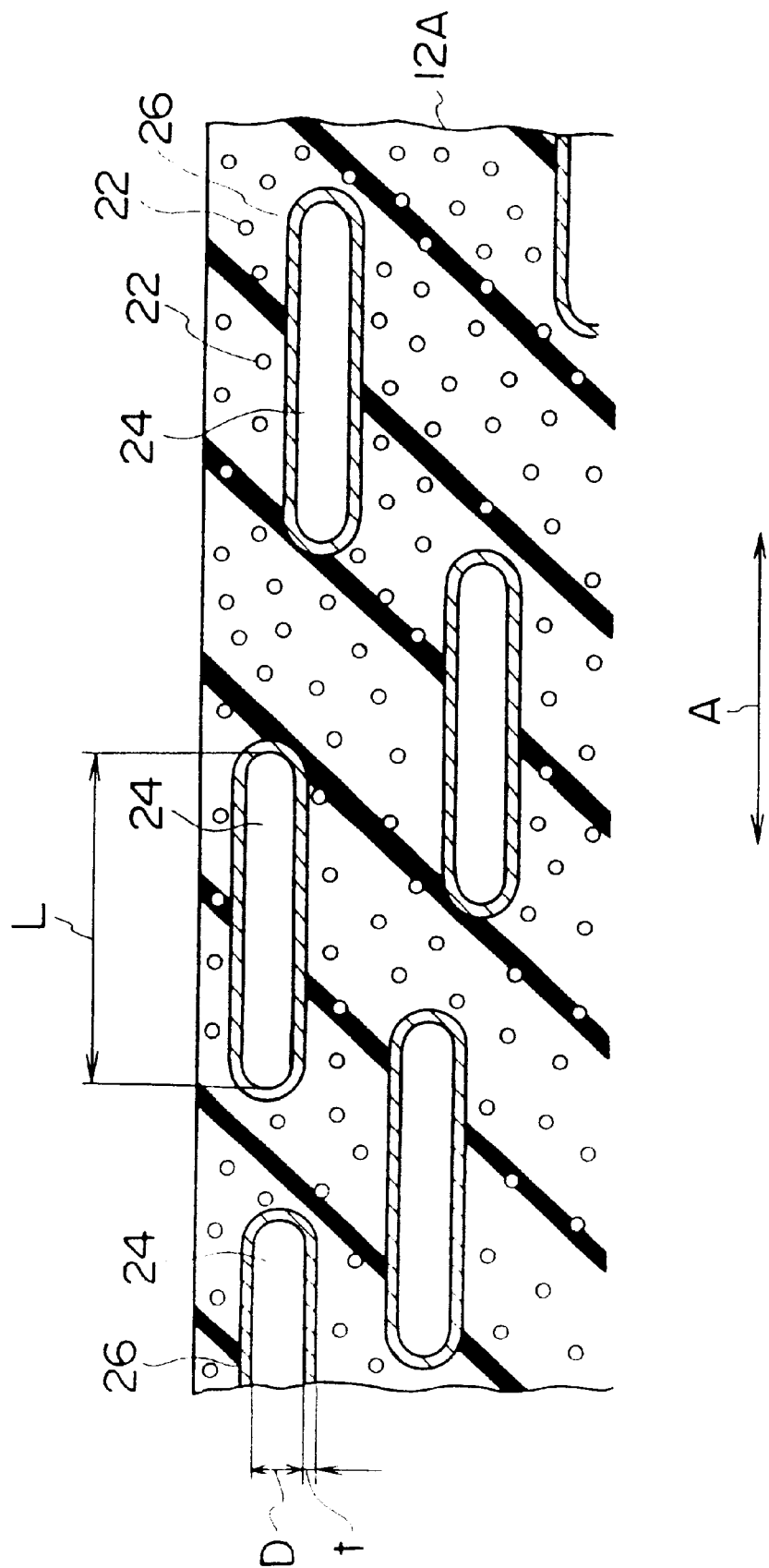
FIG. 4 is an enlarged cross-sectional view of a cap portion.

As shown in FIGS. 3 and 4, the cap portion 12A is a foam rubber which includes innumerable substantially spherical closed cells 22 and elongated closed cells 24, and nonfoam ordinary rubber is used for the base portion 12B.

As illustrated in FIG. 4, the longitudinal direction of the elongated closed cell 24 is practically the circumferential direction of the tire (the direction of arrow A), and the elongated closed cell 24 is entirely reinforced by a resinous protective layer.

Manufacturing Method

Next, a method of manufacturing the pneumatic tire 10 relating to the present embodiment will be explained.

A rubber component used for the rubber composition for forming the cap 12A preferably has a glass transition temperature of −60° C. or less. The glass transition temperature is set to this range in order to maintain sufficient rubber elasticity of the cap portion 12A of the tread 12 in a low-temperature area and to have the cap portion 12A exhibit a sufficient ice gripping ability.

Further, it is preferable that the rubber composition for forming the cap 12A includes at least one type of rubber which is selected from a group comprising a natural rubber and a diene-type synthetic rubber.

A diene-type synthetic rubber includes styrene-butadiene copolymer, cis-1,4-polyisoprene, cis-1,4-polybutadiene and the like.

Among them, in particular, cis-1,4-polybutadiene is preferably used from the standpoints of the low glass transition temperature and the increased effect on ice gripping ability. More particularly, polybutadiene having a cis content of 90% or more is preferable.

In order to form cells in the cap portion 12A, a blowing agent and a blowing auxiliary are included in the rubber composition.

An example of a blowing agent includes dinitrosopentamethylenetetramine (DPT), azodicarbonamide (ADCA), dinitrosopentastyrenetetramine, benzenesulfonylhidrazide dielectric material, oxybisbenzenesulfonylhidrazide (OBSH), or the like. Above all, azodicarbonamide (ADCA) is preferable when manufacturability is taken into consideration.

For the blowing auxiliary, an auxiliary which is used for manufacturing an ordinary blowing product such as carbamide, zinc stearate, zinc benzenesulfinic acid, zinc oxide, or the like is preferably used.

Another blowing agent and blowing auxiliary may be used.

Further, for the rubber composition, carbon black, silica, silane coupling agent, process oil, vulcanizing agent, vulcanizing accelerator, or the like are used along with the above-described components. In addition to these components, additives such as antioxidant, zinc oxide, stearic acid, antiozonant, or the like, which are usually used in the rubber industry, are mixed with the rubber composition.

Figure 5:
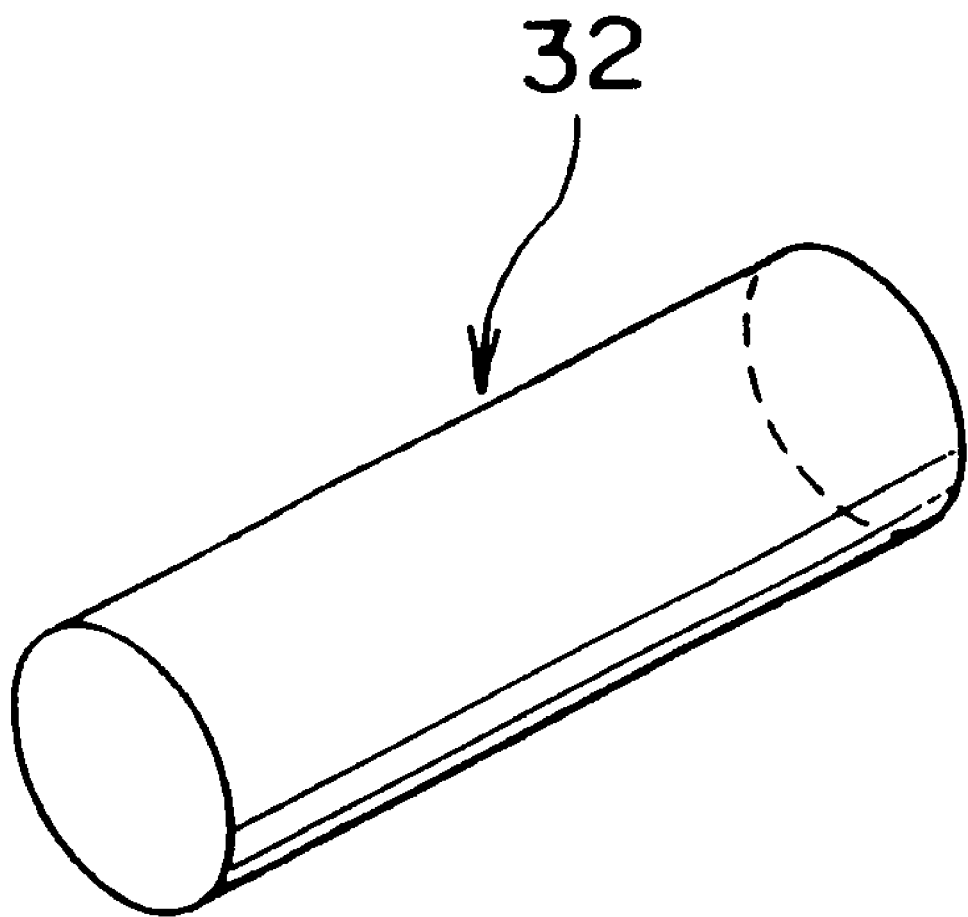
FIG. 5 is a perspective view of elongated resin.

In the refining process (kneading process) of the above-described rubber composition, an elongated resin 32 shown in FIG. 5 is kneaded so that the resins 32 are uniformly dispersed.

The resin 32 used in the present embodiment is a thermoplastic resin and the viscosity thereof is lower than that of rubber matrix in the vulcanizing process of the tire.

In general, the viscosity of a resin phase before melting is much higher than the viscosity (maximum value) of a rubber matrix after cross-linking. However, once the resin phase is melted, the viscosity thereof is sharply lowered. From the beginning to the end of the vulcanizing process of the tire, the viscosity of the rubber matrix increases due to the cross-linking reaction. In the meantime, the elongated resin phase is melted, the viscosity of the resin phase which was remarkably high is lowered due to the melting, and the viscosity of the resin phase is reversed relatively with that of the rubber matrix (in the middle of the cross-linking reaction).

The rubber matrix described herein indicates a rubber portion other than the resins 32.

In a case in which the resin 32 mixed with the rubber is crystalline polymer, an important condition for obtaining an elongated closed cell 24 which is entirely reinforced by the protective layer 26 is the melting temperature of the crystalline polymer being less than or equal to the maximum vulcanizing temperature of a tread portion.

During vulcanization, the resin is melted by heating during vulcanization and the viscosity thereof becomes lower than that of the rubber matrix. The gas is generated by the blowing agent or the like previously contained in the rubber and is dispersed or dissolved into the rubber. Then, the gas moves toward and concentrates at the inner side of the melted resin 32 which has the lowest viscosity within the tread rubber. As a result, the elongated closed cell 24 reinforced by the protective layer 26 is formed.

Therefore, in a case in which the resin 32 is crystalline polymer, it is important that the melting temperature thereof be less than or equal to the maximum vulcanizing temperature of the tread portion. In mold vulcanization, the maximum vulcanizing temperature of the tread portion described herein is the maximum temperature of the tread portion from the time the tire is placed in the mold to the time the tire is cooled after having been removed from the mold.

The viscosity of the rubber is within the range of 30 to 100 Mooney viscosity.

It can be mentioned that the melting temperature (the case of crystalline polymer) and the molecular weight control the melt viscosity of the resins 32.

The melting temperature of the resin 32 is preferably lower than the maximum vulcanizing temperature of the rubber to be used. This is because the lower the melting temperature of the resin 32 with respect to the maximum vulcanizing temperature of the tread rubber, the earlier the resin 32 melts during vulcanization. Accordingly, it is easy for the gas generated in the tread rubber to move toward and concentrate at the resins 32.

When the melting temperature of the resin 32 is too close to the maximum vulcanizing temperature of the rubber, the resin 32 melts in the final stages of the vulcanization. At that time, since the rubber matrix extracts the gas and cross-linking progresses, it is difficult for the gas to enter the melted resins 32, and therefore, it is difficult to form the elongated closed cell 24.

On the other hand, when the melting point of the resin 32 is too low, the resin 32 is melted by heating during kneading of the rubber, and the viscosity of the resin 32 decreases. Consequently, it is not preferable, because fusing each of the resins 32 occurs in the stage of mixing, and dispersibility of the resins 32 within the rubber deteriorates. Moreover, when the melting temperature of the resin 32 is too low, the elongated shape of the resin 32 cannot be maintained during mixing. Thus, the resin 32 may be segmented into a plurality of parts, or in some cases, the resin 32 may be melted into the rubber and dispersed microscopically.

Therefore, the melting temperature of the resin 32 should be selected from the range of the aforementioned concept. The melting point of the resin 32 should be set 10° C. or lower than, preferably 20° C. or lower than, and more preferably 30° C. or lower than the maximum vulcanizing temperature of the tread rubber.

Industrially, the maximum vulcanizing temperature of the rubber is about 190° C. In a case in which the maximum vulcanizing temperature thereof is set to 190° C., the melting temperature of the above-described resin 32 should be less than or equal to 190° C., preferably less than or equal to 180° C., and more preferably less than or equal to 170° C.

Further, when the mixing process of the tread rubber is taken into account, it is preferable that the melting temperature of the resin 32 be set 5° C. or higher, preferably 10° C. or higher, and more preferably 20° C. or higher than the maximum temperature of the tread rubber during mixing thereof. Supposing that the maximum temperature of the rubber in the mixing process thereof is about 95° C., the melting temperature of the resin 32 is equal to or more than 100° C., preferably equal to or more than 105° C., and more preferably equal to or more than 115° C.

As is generally known, even if the material of the resin 32 is the same, the higher the molecular weight of the resins 32, the higher the melt viscosity thereof at a certain temperature. Therefore, in order to obtain the elongated closed cell 24, the molecular weight should be selected from the range in which the viscosity of the resin 32 is not higher than the flow than the flow viscosity of the rubber at the maximum vulcanizing temperature of the tread rubber.

The results of a test show that, in the rubber composition mixed with elongated polyethylene having a weight-average molecular weight of approximately $1 \times 10^5$ to $2 \times 10^5$, the elongated closed cell 24 is formed by vulcanization. However, in the rubber composition mixed with polyethylene having an ultrahigh molecular weight of $7 \times 10^5$ or more, the gas generated within the rubber is not concentrated on the interior of polyethylene and the elongated polyethylene does not become hollow. It is considered that the result is due to the difference in the melt viscosities caused by the differences in the molecular weights.

On the other hand, if the molecular weight is too low, it is not preferable since the viscosity of the resin 32 decreases during mixing of the tread rubber. Accordingly, fusing between the respective resins 32 occurs and the dispersibility within the tread rubber deteriorates.

The molecular weight of the resin 32 used in the present invention is determined by the chemical composition of the material and the state of branching of the molecular chain. Therefore, it is not limited to the same. However, the molecular weight should be chosen from an appropriate range on the basis of the material to be selected.

The aforementioned melting temperature is a peak melting temperature which was measured by a 910-type DSC Measuring Device manufactured by E. I. du Pont de Nemours and Co. of the U.S. under the conditions of a programming rate of 10° C./min. and a sample weight of 5 mg.

The thermal characteristics of the resin 32 required for the present invention were described hereinbefore. However, the present invention is not limited to a crystalline polymer having a melting point. In so far as the elongated closed cell 24 is formed and obtained in which the outer circumferential portion thereof is provided with the protective layer 26 formed by the resins 32, the resin 32 may be noncrystalline polymer.

In a case in which the resin 32 is a noncrystalline polymer, other important requirements in the vulcanizing process are that the viscosity of the resin 32 is lower than the viscosity of the rubber until the tread rubber reaches the maximum vulcanizing temperature and that good dispersibility is obtained while the resins 32 are not fused at the mixing temperature of the rubber. The material and the molecular weight are selected so as to satisfy these requirements.

Concrete examples of the crystalline polymer resin 32 include a single composing polymer or copolymer such as polyethylene (PE; melting point: 135° C.), polypropylene (PP; melting point: 167° C.), polybutylene (melting point: 129° C.), polybutylene succinate (melting point: 115° C.), polyethylene succinate (melting point: 105° C.), syndiotactic-1,2-polybutadiene (SPB; melting point: 130°

C.). Alternatively, a material in which the melting temperature is operated within a proper range by blending or the like can be also used. Further, additives may be added to these resins 32.

Moreover, as a concrete example of noncrystalline polymer resins 32, for example, polymethyl methacrylate, acrylonitrile-butadiene styrene (ABS), or polystyrene can be used.

As long as the aforementioned requirements are satisfied, the resin 32 may be resins 32 other than those described in the concrete examples. The type of the dispersed resin 32 is not limited to one type, and plural types of resins may be used. For example, in a case in which the maximum vulcanizing temperature of the pneumatic tire 10 is 175° C., polyethylene (melting point: 135° C.) can be used. Further, both polyethylene (melting point: 135° C.) and polypropylene (melting point: 167° C.) may be dispersed.

Figure 6:
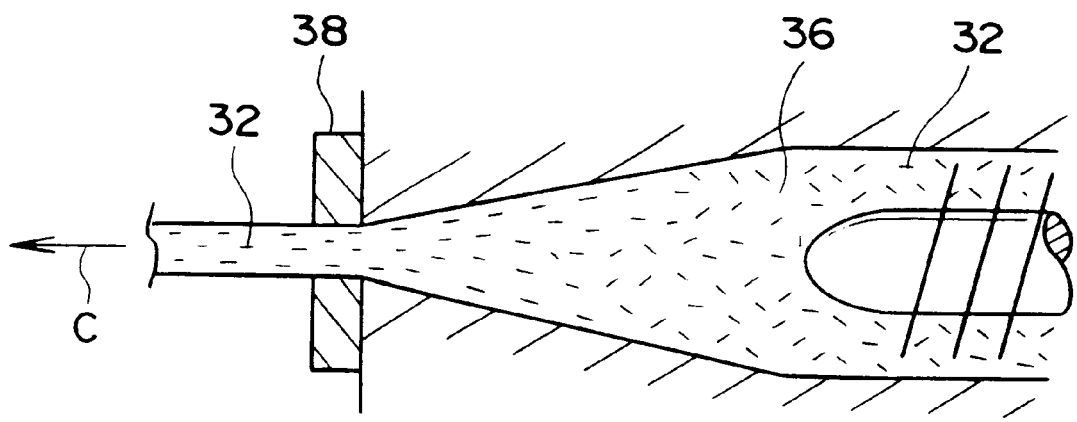
FIG. 6 is an explanatory view which explains the principle of arranging the directions of elongated resins.
Figure 7:
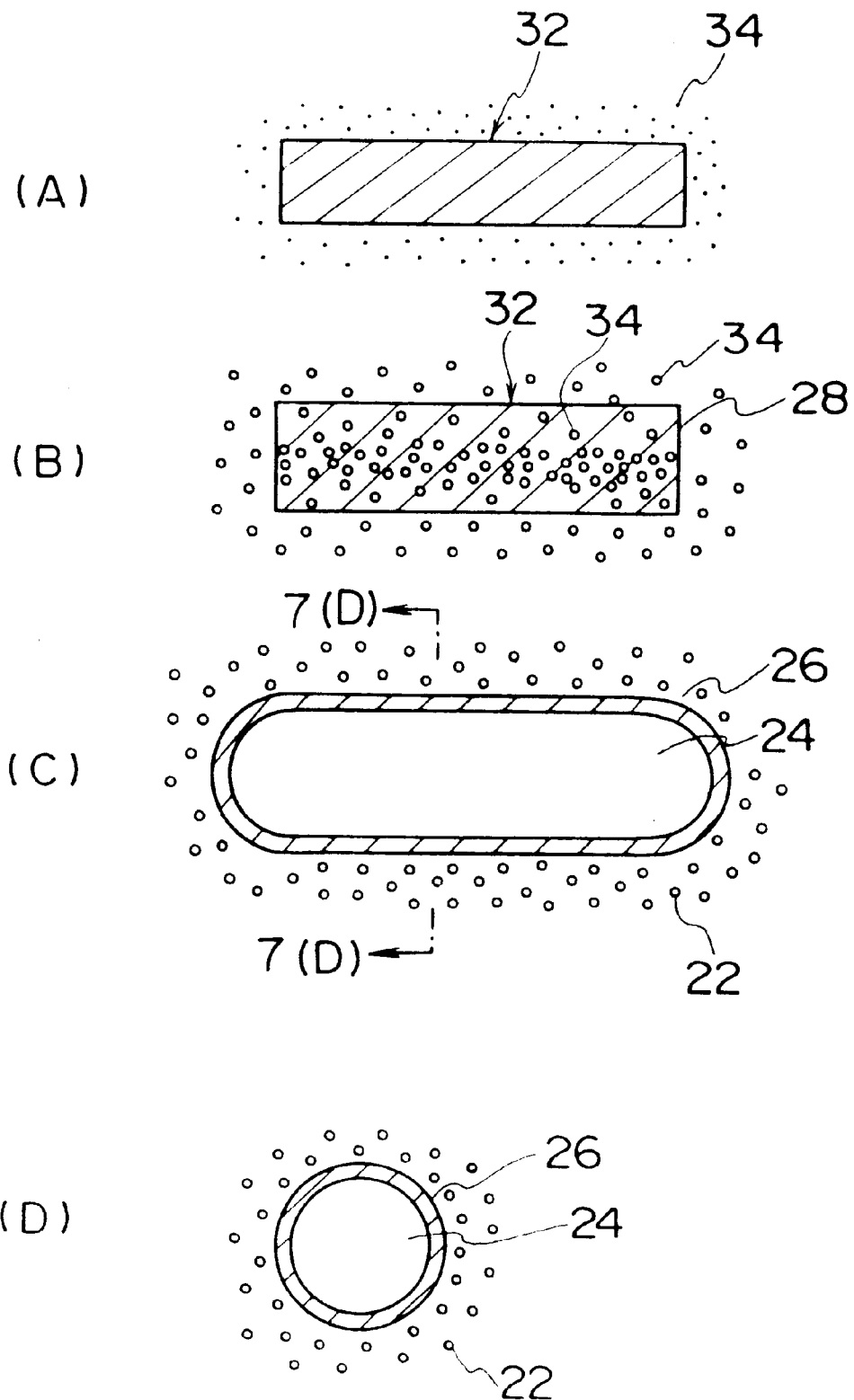
FIGS. 7(A) through (D) are explanatory views which explain the steps of forming an elongated closed cell.
Figure 8:
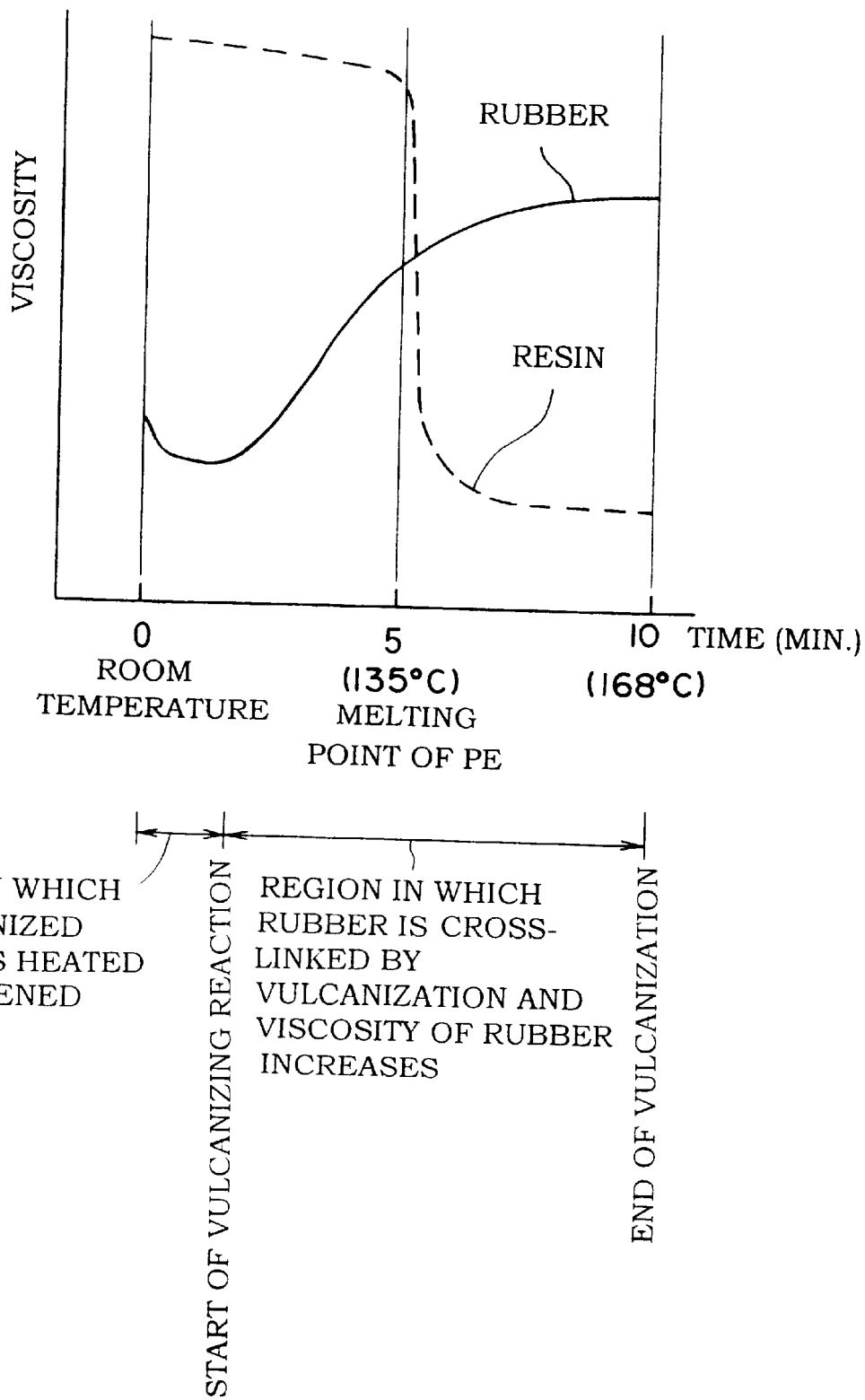
FIG. 8 is a graph which shows the relationship between the temperature (vulcanizing time) and viscosities of a rubber and a resin.

As illustrated in FIG. 6, when a raw tread rubber composition 36, with which elongated resins 32 are mixed, is extruded from a collar 38 of an extruder in which sectional area of a passage decreases towards an exit, the directions of the resins 32, i.e., the longitudinal directions of resins 32, gradually become uniform along the extruding direction (the direction of arrow C). When the resins 32 are extruded from the collar 38, the longitudinal directions of the resins 32 are uniform in the extruding direction. Thereafter, a band-shaped rubber composition 36 which has been extruded from the collar 38 is cut to predetermined lengths, and the cut rubber composition 36 can be used as the rubber of the cap portion 12A.

The degree to which the longitudinal directions of resins 32 are uniform varies in accordance with the degree of decrease in the sectional area of the passage, the velocity of extrusion, the viscosity of the rubber, or the like.

In order to arrange elongated resins 32 along the desired direction, i.e., the extruding direction, it is essential that the flowability of the rubber be controlled within the range of limited temperatures. Namely, by appropriately adding a processability modifier such as oil and liquid polymer, the viscosity of the rubber matrix is lowered and the flowability thereof is raised. Consequently, even under a limited condition in which an extruding temperature is lower than the melting temperature of elongated resins 32, it is possible that extremely good extrusion is carried out and elongated resins 32 are ideally arranged in the directions along the extruding direction.

The band-shaped raw cap portion 12A formed by the rubber composition in this way is adhered onto the raw base portion 12B, which was previously adhered to the crown portion of the raw tire casing, so that the longitudinal direction of the cap portion 12A corresponds to the circumferential direction of the tire. After the cap portion 12A and the base portion 12B are formed by vulcanization in a predetermined mold under a predetermined temperature and a predetermined pressure, the pneumatic tire 10 of the present embodiment can be formed.

As illustrated in FIG. 7(A), when the raw cap portion 12A is heated in the mold, gas 34 starts to generate by a blowing agent.

As shown in FIG. 7(B), when the raw cap portion 12A is heated so as to melt (or soften) the resins 32, and the viscosity of the resin 32 is lower than that of the rubber matrix (see FIG. 8), the gas 34 generated around the resin 32 moves into the resins 32.

Finally, cells of the gas 34 moved into the melted resin 32 are connected so as to form an elongated space. The gas generated in an area separated from the resin 32 stays as it is.

As illustrated in FIGS. 7(C) and 7(D), the cooled cap portion 12A becomes a foam rubber in which spherical closed cells 22 and an elongated closed cell 24, whose outer circumferential portion is reinforced by the protective layer 26 of the solidified resins 32, are formed.

Operation

Next, the operation of the present embodiment will be explained.

Figure 9:
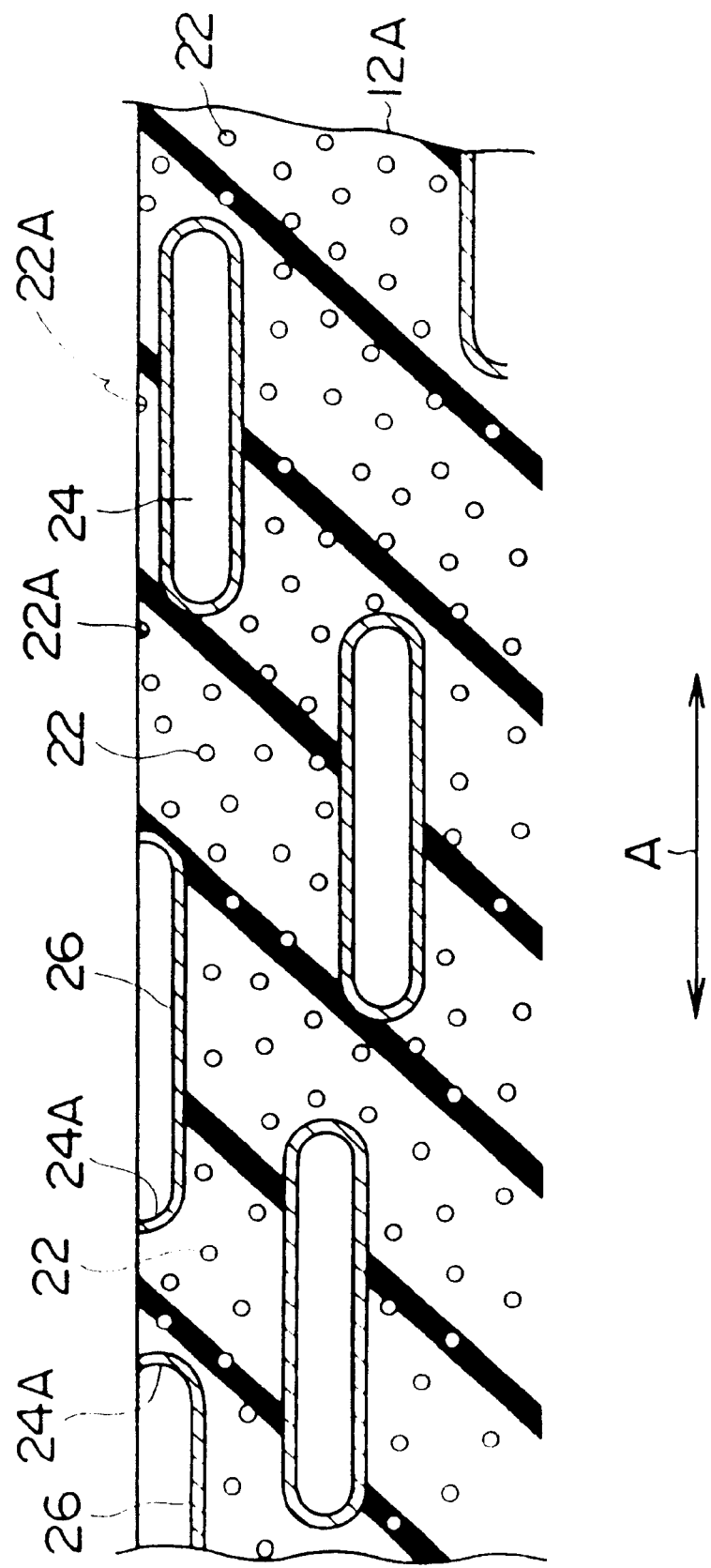
FIG. 9 is an enlarged cross-sectional view of a worn cap portion.

As shown in FIG. 9, when a vehicle equipped with pneumatic tires 10 according to the present embodiment is driven, substantially spherical concave portions 22A formed by the spherical closed cells 22 and groove-shaped concave portions 24A formed by the elongated closed cells 24 appear on the ground contact surface of the tread 12 in the extremely initial stages of wear.

When the vehicle equipped with the pneumatic tires 10 according to the present embodiment is driven on ice, a water membrane is generated between the tire and the icy surface due to ground pressure and frictional heat. However, water (the water membrane) from the ground contact surface is quickly drained and removed by the plurality of concave portions 22A and 24A formed on the ground contact surface of the tread 12.

Further, since drainability towards the rear side of the ground contact surface in the rotating direction of the tire is improved by the groove-shaped concave portions 24A whose longitudinal directions are practically the circumferential direction of the tire, braking ability on ice improves in particular.

Moreover, because the outer circumferential portion of the groove-shaped concave portion 24A is reinforced by the protective layer 26 which is harder than the rubber matrix, it is difficult for the concave portions 24A to be crushed and high drainability can always be maintained, even when a heavy load is applied.

Further, in the pneumatic tire 10 of the present embodiment, a scratching effect occurs due to the protective layer 26 exposed on the ground contact surface. The scratching effect may provide an improved $\mu$(a coefficient of friction) on ice in the lateral direction and handling on ice.

In accordance with a method of manufacturing a pneumatic tire of the present invention, it is possible that the elongated resin 32 be made hollow under high temperature and high pressure at the time of forming by vulcanization and that the elongated closed cell 24 which is reinforced by the protective layer 26 and which can obtain sufficient drainability be reliably formed.

In the foam rubber portion which constitutes the cap portion 12A, if an overall foaming ratio $V_s$ is a combination of a foaming ratio $V_{s1}$ of the spherical closed cell 22 and a foaming ratio $V_{s2}$ of the elongated closed cell 24, it is desirable that the overall foaming ratio $V_s$ is within the range of 3 to 40%, and preferably 5 to 35%. The overall foaming ratio $V_s$ is expressed as $V_s=(\rho_0/\rho_1-1)\times100(\%)$, wherein $\rho_1$ is a density of the foam rubber (g/cm$^3$), and $\rho_0$ is a density of a solid-phase portion of the foam rubber (g/cm$^3$).

If the overall foaming ratio $V_s$ is less than 3%, due to absolute lack of volume of the concave portion with respect to the generating water membrane, sufficient drainability cannot be effected and improvement of the effect of ice gripping ability cannot be anticipated.

If the overall foaming ratio $V_s$ is greater than 40%, improvement of the effect of ice gripping ability is sufficient. However, since there is too much porosity in the rubber, the breaking limitation of the compound is greatly reduced and durability thereof is not desirable.

Within the set range of the overall foaming ratio $V_s$, i.e., 3 to 40%, it is important that the elongated closed cell 24 occupy 10% or more of the overall foaming ratio $V_s$. If it is less than 10%, there are few appropriate elongated water passages. Thus, the effect of having elongated closed cells is lessened with respect to the case of having only spherical closed cells.

The average diameter of the elongated close cell is actually 2.3 to 400 μm. Under the general manufacturing conditions of the vulcanization of the tire, the finished hollow diameter of a desirable elongated closed cell 24 is 20 to 500 μm. Thus, the average diameter of the resin 32 should be approximately 2.3 to 400 μm in a stage before the elongated closed cell 24 becomes hollow.

On the other hand, the average hollow diameter D (i.e., the inner diameter of the protective layer 26; see FIG. 4) of the elongated closed cell 24 is preferably within the range of 20 to 500 μm.

If the average hollow diameter D of the elongated closed cell 24 is less than 20 μm, it is not preferable since the drainability decreases. On the other hand, if the average diameter D of the elongated closed cell 24 is greater than 500 μm, it is not preferable because cut resistance and block tearing deteriorate, and, additionally, wear resistance on a dry road surface deteriorates.

Moreover, the ratio L/D in which the maximum length L of one elongated closed cell 24 to the average hollow diameter D thereof is preferably 3 or more.

When the ratio L/D is 3 or more, the groove-shaped concave portion 24A which appears on the surface of the worn rubber becomes longer, and while the average hollow diameter D is within the aforementioned most appropriate range, the volume of the groove-shaped concave portion 24A can be increased and a large amount of water can be drained. In particular, if the end portions of the groove-shaped concave portion 24A are connected to the circumferential direction groove 14, the lateral groove 16 and the siping 16, the concave portion 24A can drain the absorbed water into the circumferential groove 14, the lateral groove 16, and the siping 19.

In the above-described pneumatic tire 10, the longitudinal direction of the elongated closed cell 24 is the circumferential direction of the tire. However, due to the manufacturing processes (see FIG. 3), the longitudinal direction of a portion of the elongated closed cells 24 may be oriented in the direction other than the circumferential direction of the tire.

If the longitudinal direction of the elongated closed cell 24 is the axial direction of the tire (the direction of arrow B), the direction of the groove-shaped concave portion 24A is the axial direction of the tire. Accordingly, drainability in the lateral direction of the tire can be particularly improved.

The above-described pneumatic tire 10 is used for a so-called passenger car. Needless to say, the present invention can be applied to tires for a vehicle other than passenger cars, e.g., tires for trucks and buses.

In the above embodiment, the vulcanizing temperature is 175° C. However, the vulcanizing temperature is appropriately changed in accordance with the material of the rubber, the type of tire, and the like.

In the present invention, the shape of a tire, such as the shape of a siping, block, or the like is chosen freely.

Moreover, a band-shaped rubber composition which includes the elongated resins 32 is vulcanized in a predetermined mold and can be used as a tread for renewing a retreaded tire.

The rubber composition which includes the elongated closed cells 24 can be used for a solid tire, the bottom of shoes, and the ground contact portion of a rubber tire chain which is used when a vehicle runs on a snowy/icy road surface. The rubber composition may be used for other products.

In order to prevent crushing of the elongated closed cell 24, adhesion between the protective layer 26 and the surrounding matrix rubber is critical. For instance, the polyethylene used in the embodiment of the present invention is adhered to the rubber to some extent due to the temporarily melting of the polyethylene. However, in order to further improve adhesion between the matrix rubber and the protective layer 26, for example, there are a method of effecting surface treatment on resins 32, a method of containing in resins 32 a component of improving adhesion to the rubber, and the like.

In the above embodiment, elongated resins 32 are kneaded with a rubber material or the like so as to not melt the resins 32, and the kneaded product is extruded from the collar of the extruder whose sectional area gradually decreases. The rubber composition which includes elongated resins 32 whose longitudinal directions are uniform along the extruding direction is thereby obtained. However, the similar rubber composition can be obtained by the other methods.

For example, when granular resins are kneaded with the rubber material or the like, the temperature during extrusion is set so as to melt or soften the resins, and resins are extruded from the collar of the extruder, the rubber composition is extruded therefrom while the melted or softened resins are gradually extended in the extruding direction. When the rubber composition is extruded from the collar, the resins are formed into elongated shapes whose longitudinal directions are along the extruding direction.

TEST EXAMPLES

In order to confirm the effect of the present invention, tires according to the present invention (Examples 1 through 14) and comparative tires (Comparative Examples 1 through 10) were manufactured on an experimental basis so as to compare ice gripping ability, viscosity of a rubber matrix, viscosity a resin of a rubber composition used for a cap portion of a tread, refining workability of the rubber composition, and crack durability at the bottom of the groove. Further, a volume ratio between a spherical closed cell and an elongated closed cell, an average inner diameter of the elongated closed cell, L/D of the elongated closed cell, and thickness of a resinous layer of the elongated closed cell were compared.

① Viscosity

In the case of rubber:

Viscosity was measured at the maximum temperature of a tread under the following conditions: When the torque of the rubber reached Max, the measurement of a viscosity was terminated. The torque of the rubber was considered as the viscosity of the rubber, and changes in the torque and changes in the foaming pressure were measured.

In order to measure the viscosity, a cone-rheometer-type 1-C Type manufactured by Monsanto Co. was used. While the temperature of the machine was changed, a constant amplitude input of 100 cycles/min. was applied. The torque value at that time was regarded as the viscosity of the rubber. (Dome pressure: 6.0 kg/cm$^2$, holding pressure: 8.0 kg/cm$^2$, closing pressure: 8.0 kg/cm$^2$, and angle of swing: ±5°)

In the case of resin:

A starting temperature was set to 190° C., and while the temperature was lowered by 5° C. at a time, the temperature dependence of viscosity was measured by regarding generating torque as the viscosity of the resin. The viscosity of a resin at the maximum temperature of a tread was read from the obtained curve and was compared to the viscosity of a rubber matrix. The measurement of the viscosity of the resin was effected under the same conditions (except for temperature) as the measurement of the viscosity of rubber.

② Volume Ratio Between Spherical Closed Cell and Elongated Closed Cell

A center portion block piece was cut out from the tread of a tire, and further, an observation surface was excised by a sharp razor perpendicular to the circumferential direction of the tire and perpendicular to the surface of the tread. The cut sample was photographed through a scanning electron microscope with a magnification of 100. The site for taking photographs is chosen at random.

Next, in the photograph, a spherical closed cell portion and an elongated closed cell portion equipped with a resinous protective layer were differentiated. The open surface area of each of the cells was measured so as to calculate the area ratio between the spherical closed cell and the elongated closed cell within a certain open surface area.

The above-described measurement was effected ten times so as to obtain the average of the area ratios. The average value was regarded as the volume ratio between the spherical closed cell and the elongated closed cell.

③ Hardness

The hardness of a vulcanized rubber composition was measured at a room temperature (24° C.) in accordance with JIS K6301.

④ A Average Inner Diameter of Elongated Closed Cell

Regarding the average inner diameter of an elongated closed cell, the entire open surface area of the elongated closed cell obtained in the above measurement was divided by the number of observed elongated closed cells in such a way that an average sectional area of one closed cell was obtained. When it was assumed that the sectional area of the closed cell is completely circular, the diameter thereof was calculated from the following formula:

$$\text{Inner diameter of elongated closed cell} = (\text{sectional area of one closed cell} \div \pi)^{0.5} \times 2$$

The above-described measurement was effected ten times, and the average value was regarded as the inner diameter of the elongated closed cell.

⑤ L/D

L/D is the value of the length of mixed short fibers divided by the inner diameter which is obtained in accordance with the above measurement. Although the length of the elongated closed cell may be directly measured by cutting a sample along the closed cell, L/D was defined as above, since direct measurement includes many errors.

⑥ Thickness of Resinous Layer of Elongated Closed Cell

With reference to the thickness of the resinous layer of an elongated closed cell, the cut sample used in the above measurement was utilized. The magnification of the scanning electron microscope was raised so as to be able to measure the thickness of the resin, and then the cut sample was photographed. The thickness of four positions of one elongated closed cell were measured. The measurement was carried out on 40 elongated closed cells, and the average value was regarded as the thickness of the protective layer of the elongated closed cell.

⑦ Refining Workability (Dispersibility of Elongated Resin)

Evaluation was made using the three stages of ○, X, and Δ.

○: Problem-free.

Δ: A small amount of poorly dispersed elongated resins (diameter of less than 5 mm) are found in part.

X: A plurality of blocks of elongated resins (diameter of 5 mm or more) are found.

⑧ Ice Gripping Ability

Tires were mounted on a 1600 cc passenger car manufactured in Japan and the car was driven on an flat icy road. The brakes were applied at a speed of 20 km/h. The distance between the locking of tires and the halt thereof was measured. The inverse number of the distance was expressed as an index number, wherein the inverse number of the distance of a Comparative Tire 1 was 100. It shows that the larger the numerical value, the better the ice gripping ability.

⑨ Crackability at Bottom of Groove after Car Driven 20,000 km on Road

After a car was driven 20,000 km on road in an urban area, the crackability at the bottom portion of the groove was evaluated.

Evaluation was made by using the two stages of ○ and X.

○: No crack at the bottom of the groove.

X: Cracks exist at the bottom of the groove (a continuous length of 5 mm or more).

Examples and Comparative Examples will be explained hereinafter.

The size of each of the tires is 185/70R13, and four blocks are arranged on the tread of any of the tire in the transverse direction thereof. With regard to the size of the block, the dimension L in the circumferential direction of the tire is 35 mm and the dimension W in the transverse direction thereof is 30 mm. Additionally, the width of the siping formed on the tread is 0.4 mm, and the interval between the sipings in the circumferential direction of the tire is about 7 mm.

In the Tables, blowing agent DPT is Cellular D manufactured by Eiwa Kasei Co.; blowing agent ADCA is Vinyhole V manufactured by Eiwa Kasei Co.; blowing auxiliary A is zinc benzenesulfinic acid manufactured by Otsuka Kagaku Co.; blowing auxiliary B is a blend of urea/zinc stearate (85:15) manufactured by Otsuka Kagaku Co.; and blowing auxiliary C is urea (Cellpaste J manufactured by Eiwa Kasei Co.). Carbon: N220 (trade name) is Asahi #80 manufactured by Asahi Carbon Co. Rubber matrix (unvulcanized) is a rubber composition excluding resins. The first closed cell in the rubber composition indicates the spherical closed cell described in the aforementioned embodiment, and the second closed cell in the rubber composition indicates the elongated closed cell described therein. Moreover, in the type (name) of the elongated resins in Tables 1 through 4, PE indicates polyethylene and PP indicates polypropylene.

The other specifications and the results of the test are given in Tables 1 through 4.

As shown in Tables 1 through 4, it is clear that ice gripping abilities of any of the tires from Examples 1 through 14 according to the present invention were better than those of the tires of Comparative Examples 1 through 10.

In the tires of Comparative Examples 2 and 3 and Examples 1 through 5, polyethylene having 3-denier short fibers and a length of 2 mm was mixed with the rubber composition as a resin by changing the parts of polyethylene. When the amount of resin was less than 0.5 parts as in the Comparative Example 2, the amount to be mixed was too small. Accordingly, the intended ice gripping ability of 105 or more with respect to the ice gripping ability of Comparative Example 1 was not able to be achieved.

On the other hand, when the amount of resin was 30 parts or more, there were drawbacks such as poor dispersion at the time of refining of the rubber, poor workability at the time of extruding of the rubber (rough surface), and the occurrence of cracks on the tread.

PET short fibers were blended as resin in the tires of Comparative Example 4. The tires were not melted at 175° C. which is a vulcanizing temperature to be assumed, such that the hardness thereof was not able to be measured by a cone rheometer. Therefore, the elongated closed cell reinforced by the resinous protective layer was not able to be obtained.

In Comparative Examples 5 and 6 and Examples 6 through 8, the average hollow diameter of the elongated closed cell was varied by changing the diameter of the mixed resin. When the average hollow diameter was less than 15 μm, the volume of the groove-shaped concave portions formed on the surface of the worn tread was too small such that the intended ice gripping ability (the index number of 105 or more) was not able to be obtained. On the contrary, when the average hollow diameter was more than 500 μm, the crackability at the bottom of the groove was poor.

In Comparative Examples 7 through 9 and Examples 9 through 11, the set foaming ratios were changed. When the foaming ratio was too low, the amount of cells introduced into the resin was small such that a sufficient effect of drainability was not able to be obtained. On the contrary, when the foaming ratio was more than 40%, the spherical closed cells were highly connected, and thus, the effect of introducing the elongated closed cell was small. Further, in this case, the tires were worn considerably.

In Comparative Example 10 and Examples 12 through 14, the thickness of the protective layer of the elongated closed cell was changed by changing the diameter and part of the contained resin. When the thickness of the protective layer was too thin, the shape of the draining passage was badly maintained so that the effect of ice gripping ability was reduced. On the other hand, when the thickness of the protective layer was too thick, the actual draining volume of the elongated closed cell was small, and the rubber was hardened as the movement thereof was restricted. Inversely, the ice gripping ability was lowered.

INDUSTRIAL APPLICABILITIES

As described hereinbefore, the pneumatic tire relating to the first invention is especially suitable when a vehicle equipped with the tires runs on ice.

The method of manufacturing the pneumatic tire relating to the second invention can facilitate manufacturing of the pneumatic tire which is especially suitable when a vehicle equipped with the tires runs on ice.

The rubber composition relating to the third invention is suitable for manufacturing a product, e.g., a pneumatic tire, which is needed for controlling the slipping of a vehicle on ice.

The vulcanized rubber composition relating to the fourth invention is suitable to be used by a product, e.g., a pneumatic tire, which is needed for controlling the slipping of a vehicle on ice.

TABLE 1

| | | Comp. Ex. 1 | Comp. Ex. 2 | Ex. 1 | Ex. 2 | Ex. 3 | Ex. 4 |
|---|---|---|---|---|---|---|---|
| Formulation of Rubber Composition | Natural Rubber | 70 | 70 | 70 | 70 | 70 | 70 |
| | Butadiene Rubber | 30 | 30 | 30 | 30 | 30 | 30 |
| | Carbon: N220 | 50 | 50 | 50 | 50 | 50 | 50 |
| | Silica | 0 | 0 | 0 | 0 | 0 | 0 |
| | Silane Coupling Agent | 0 | 0 | 0 | 0 | 0 | 0 |
| | Process Oil | 2 | 2 | 2 | 2 | 2 | 2 |
| | Stearic Acid | 1.5 | 1.5 | 1.5 | 1.5 | 1.5 | 1.5 |
| | Zinc Oxide | 3 | 3 | 3 | 3 | 3 | 3 |
| | Antioxidant | 1 | 1 | 1 | 1 | 1 | 1 |
| | Vulcanizing Accelerator | 0.2 | 0.2 | 0.2 | 0.2 | 0.2 | 0.2 |
| | Vulcanizing Accelerator | 0.5 | 0.5 | 0.5 | 0.5 | 0.5 | 0.5 |
| | Sulfur | 1.2 | 1.2 | 1.2 | 1.2 | 1.2 | 1.2 |
| | Blowing Agent: | | | | | | |
| | DPT | 3 | 3 | 3 | 3 | 3 | 3 |
| | ADCA | 0 | 0 | 0 | 0 | 0 | 0 |
| | Blowing Auxiliary | | | | | | |
| | A | 0 | 0 | 0 | 0 | 0 | 0 |
| | B | 0 | 0 | 0 | 0 | 0 | 0 |
| | C | 2.5 | 2.5 | 2.5 | 2.5 | 2.5 | 2.5 |
| | Elongated Resin | 0 | 0.1 | 0.5 | 2 | 6 | 10 |
| Elongated Resin | Type (Name) | — | PE | PE | PE | PE | PE |
| | Melting Point (*1) | — | 135 | 135 | 135 | 135 | 135 |
| | Diameter μm | — | 23 | 23 | 23 | 23 | 23 |
| | Length mm | — | 2 | 2 | 2 | 2 | 2 |
| | Viscosity (*2) @ 175° C. | — | 6 | 6 | 6 | 6 | 6 |
| | Viscosity (*2) @ 110° C. | — | 120 | 120 | 120 | 120 | 120 |
| Rubber Matrix (Unvulcanized) | Viscosity Minimum Value @ 175° C. | 13 | 13 | 13 | 13 | 13 | 13 |
| | Viscosity Minimum Value @ 110° C. | 18 | 18 | 18 | 18 | 18 | 18 |
| Vulcanized Rubber Composition | Overall Foaming Ratio % | 25 | 25 | 25 | 25 | 25 | 25 |
| | Volume Ratio between First: Second Closed Cells | 100:0 | 99:1 | 90:10 | 54:46 | 29:71 | 20:80 |
| | Hardness (Degree) | 52 | 52 | 52 | 52 | 54 | 56 |
| First Closed Cell | Shape | spherical | spherical | spherical | spherical | spherical | spherical |
| | Average Diameter (μm) | | | | | | |

TABLE 1-continued

|  |  | Comp. Ex. 1 | Comp. Ex. 2 | Ex. 1 | Ex. 2 | Ex. 3 | Ex. 4 |
|---|---|---|---|---|---|---|---|
| Second Closed Cell (with Protective Layer) | Shape | — | elongated | elongated | elongated | elongated | elongated |
|  | Average Hollow Diameter: D ($\mu$m) | — | 50 | 74 | 110 | 116 | 115 |
|  | L/D | — | 40 | 27 | 18 | 17 | 17 |
|  | Thickness of Protective Layer: t ($\mu$m) | — | 2.7 | 2.4 | 2.8 | 5.6 | 8.4 |
| Mixing Workability | Dispersibility of Elongated Resin | — | ○ | ○ | ○ | ○ | ○ |
| Performance of Tire | Ice Gripping Ability | 100 | 101 | 105 | 116 | 127 | 135 |
| Cracking durability at Bottom of Groove After Car Driving 20,000 km |  | ○ | ○ | ○ | ○ | ○ | ○ |

Silane coupling agent: bis(3-triethoxysilylpropyl)-tetrasulfide [$(C_2H_5O)_3SiC_3H_6]_2S_4$
Comp. Ex. = Comparative Example
Ex. = Example

TABLE 2

|  |  | Ex. 5 | Comp. Ex. 3 | Comp. Ex. 4 | Comp. Ex. 5 | Ex. 6 | Ex. 7 |
|---|---|---|---|---|---|---|---|
| Formulation of Rubber Composition | Natural Rubber | 70 | 70 | 70 | 70 | 70 | 70 |
|  | Butadiene Rubber | 30 | 30 | 30 | 30 | 30 | 30 |
|  | Carbon: N220 | 50 | 50 | 50 | 50 | 50 | 50 |
|  | Silica | 0 | 0 | 0 | 0 | 0 | 0 |
|  | Silane Coupling Agent | 0 | 0 | 0 | 0 | 0 | 0 |
|  | Process Oil | 2 | 2 | 2 | 2 | 2 | 2 |
|  | Stearic Acid | 1.5 | 1.5 | 1.5 | 1.5 | 1.5 | 1.5 |
|  | Zinc Oxide | 3 | 3 | 3 | 3 | 3 | 3 |
|  | Antioxidant | 1 | 1 | 1 | 1 | 1 | 1 |
|  | Vulcanizing Accelerator | 0.2 | 0.2 | 0.2 | 0.2 | 0.2 | 0.2 |
|  | Vulcanizing Accelerator | 0.5 | 0.5 | 0.5 | 0.5 | 0.5 | 0.5 |
|  | Sulfur | 1.2 | 1.2 | 1.2 | 1.2 | 1.2 | 1.2 |
|  | Blowing Agent: |  |  |  |  |  |  |
|  | DPT | 3 | 3 | 3 | 3 | 3 | 3 |
|  | ADCA | 0 | 0 | 0 | 0 | 0 | 0 |
|  | Blowing Auxiliary |  |  |  |  |  |  |
|  | A | 0 | 0 | 0 | 0 | 0 | 0 |
|  | B | 0 | 0 | 0 | 0 | 0 | 0 |
|  | C | 2.5 | 2.5 | 2.5 | 1.5 | 2.5 | 3 |
|  | Elongated Resin | 25 | 35 | 6 | 6 | 6 | 6 |
| Elongated Resin | Type (Name) | PE | PE | PET | PE | PE | PE |
|  | Melting Point (*1) | 135 | 135 | 255 | 135 | 135 | 135 |
|  | Diameter $\mu$m | 23 | 23 | 23 | 14 | 14 | 70 |
|  | Length mm | 2 | 2 | 2 | 0.5 | 0.5 | 2 |
|  | Viscosity (*2) @ 175° C. | 6 | 6 | um | 6 | 6 | 6 |
|  | Viscosity (*2) @ 110° C. | 120 | 120 | um | 120 | 120 | 120 |
| Rubber Matrix (Unvulcanized) | Viscosity Minimum Value @ 175° C. | 13 | 13 | 13 | 13 | 13 | 13 |
|  | Viscosity Minimum Value @ 110° C. | 18 | 18 | 18 | 18 | 18 | 18 |
| Vulcanized Rubber Composition | Overall Foaming Ratio % | 25 | 25 | 25 | 25 | 25 | 25 |
|  | Volume Ratio between First: Second Closed Cells | 16:84 | 8:92 | 100:0 | 99:1 | 90:10 | 20:80 |
|  | Hardness (Degree) | 58 | 62 | 56 | 56 | 56 | 56 |
| First Closed Cell | Shape | spherical | spherical | spherical | spherical | spherical | spherical |
|  | Average Diameter ($\mu$m) |  |  |  |  |  |  |
| Second Closed Cell (with Protective Layer) | Shape | elongated | elongated | no foaming | elongated | elongated | elongated |
|  | Average Hollow Diameter: D ($\mu$m) | 113 | 110 | — | 12 | 35 | 200 |
|  | L/D | 18 | 18 | — | 42 | 14 | 10 |
|  | Thickness of Protective Layer: t ($\mu$m) | 17.0 | 21.9 | — | 19.3 | 12.7 | 8.5 |
| Mixing Workability | Dispersibility of Elongated Resin | Δ | × | ○ | ○ | ○ | ○ |
| Performance of Tire | Ice Gripping Ability | 122 | 110 | 104 | 102 | 105 | 121 |

TABLE 2-continued

|  | Ex. 5 | Comp. Ex. 3 | Comp. Ex. 4 | Comp. Ex. 5 | Ex. 6 | Ex. 7 |
|---|---|---|---|---|---|---|
| Cracking durability at Bottom of Groove After Car Driving 20,000 km | ○ | × | ○ | ○ | ○ | ○ |

Silane coupling agent: bis(3-triethoxysilylpropyl)-tetrasulfide
$[(C_2H_5O)_3SiC_3H_6]_2S_4$
Comp. Ex. = Comparative Example
Ex. = Example
um = unmeasurable

TABLE 3

|  |  | Ex. 8 | Comp. Ex. 6 | Comp. Ex. 7 | Ex. 9 | Comp. Ex. 8 | Ex. 10 |
|---|---|---|---|---|---|---|---|
| Formulation of Rubber Composition | Natural Rubber | 70 | 70 | 30 | 30 | 30 | 30 |
|  | Butadiene Rubber | 30 | 30 | 70 | 70 | 70 | 70 |
|  | Carbon: N220 | 50 | 50 | 20 | 20 | 20 | 20 |
|  | Silica | 0 | 0 | 35 | 35 | 35 | 35 |
|  | Silane Coupling Agent | 0 | 0 | 3.5 | 3.5 | 3.5 | 3.5 |
|  | Process Oil | 2 | 2 | 10 | 10 | 10 | 10 |
|  | Stearic Acid | 1.5 | 1.5 | 2 | 2 | 2 | 2 |
|  | Zinc Oxide | 3 | 3 | 3.5 | 3.5 | 3.5 | 3.5 |
|  | Antioxidant | 1 | 1 | 1 | 1 | 1 | 1 |
|  | Vulcanizing Accelerator | 0.2 | 0.2 | 0.8 | 0.8 | 0.8 | 0.8 |
|  | Vulcanizing Accelerator | 0.5 | 0.5 | 1 | 1 | 1 | 1 |
|  | Sulfur | 1.2 | 1.2 | 1 | 1 | 1 | 1 |
|  | Blowing Agent: |  |  |  |  |  |  |
|  | DPT | 3 | 3 | 0 | 0 | 0 | 0 |
|  | ADCA | 0 | 0 | 1.75 | 1.75 | 4.55 | 4.55 |
|  | Blowing Auxiliary |  |  |  |  |  |  |
|  | A | 0 | 0 | 1 | 1 | 2.6 | 2.6 |
|  | B | 0 | 0 | 1 | 1 | 2.6 | 2.6 |
|  | C | 3.5 | 3.5 | 0 | 0 | 0 | 0 |
|  | Elongated Resin | 6 | 6 | 0 | 6 | 0 | 6 |
| Elongated Resin | Type (Name) | PE | PE | — | PE | — | PE |
|  | Melting Point (*1) | 135 | 135 | — | 135 | — | 135 |
|  | Diameter μm | 180 | 205 | — | 23 | — | 23 |
|  | Length mm | 2 | 2 | — | 0.5 | — | 0.5 |
|  | Viscosity (*2) @ 175° C. | 6 | 6 | — | 6 | — | 6 |
|  | Viscosity (*2) @ 110° C. | 120 | 120 | — | 120 | — | 120 |
| Rubber Matrix (Unvulcanized) | Viscosity Minimum Value @ 175° C. | 13 | 13 | 11 | 11 | 11 | 11 |
|  | Viscosity Minimum Value @ 110° C. | 18 | 18 | 14 | 14 | 14 | 14 |
| Vulcanized Rubber Composition | Overall Foaming Ratio % | 25 | 25 | 3 | 3 | 25 | 25 |
|  | Volume Ratio between First: Second Closed Cells | 2:98 | 0:100 | 100:0 | 3:97 | 100:0 | 25:75 |
|  | Hardness (Degree) | 56 | 56 | 57 | 59 | 50 | 52 |
| First Closed Cell | Shape | spherical | — | spherical | spherical | spherical | spherical |
|  | Average Diameter (μm) |  |  |  |  |  |  |
| Second Closed Cell (with Protective Layer) | Shape | elongated | elongated | — | elongated | — | elongated |
|  | Average Hollow Diameter: D (μm) | 500 | 570 | — | 50 | — | 110 |
|  | L/D | 4 | 3.5 | — | 10 | — | 5 |
|  | Thickness of Protective Layer: t (μm) | 16.7 | 18.8 | — | 12.7 | — | 5.8 |
| Mixing Workability | Dispersibility of Elongated Resin | ○ | ○ | — | ○ | — | ○ |
| Performance of Tire | Ice Gripping Ability | 105 | 105 | 100 | 105 | 100 | 129 |
|  | Cracking durability at Bottom of Groove After Car Driving 20,000 km | ○ | × | ○ | ○ | ○ | ○ |

Silane coupling agent: bis(3-triethoxysilylpropyl)-tetrasulfide
$[(C_2H_5O)_3SiC_3H_6]_2S_4$
Comp. Ex. = Comparative Example
Ex. = Example

TABLE 4

|  |  | Comp. Ex. 9 | Ex. 11 | Comp. Ex. 10 | Ex. 12 | Ex. 13 | Ex. 14 |
|---|---|---|---|---|---|---|---|
| Formulation of Rubber Composition | Natural Rubber | 30 | 30 | 30 | 30 | 30 | 30 |
|  | Butadiene Rubber | 70 | 70 | 70 | 70 | 70 | 70 |
|  | Carbon: N220 | 20 | 20 | 20 | 20 | 20 | 20 |
|  | Silica | 35 | 35 | 35 | 35 | 35 | 35 |
|  | Silane Coupling Agent | 3.5 | 3.5 | 3.5 | 3.5 | 3.5 | 3.5 |
|  | Process Oil | 10 | 10 | 10 | 10 | 10 | 10 |
|  | Stearic Acid | 2 | 2 | 2 | 2 | 2 | 2 |
|  | Zinc Oxide | 3.5 | 3.5 | 3.5 | 3.5 | 3.5 | 3.5 |
|  | Antioxidant | 1 | 1 | 1 | 1 | 1 | 1 |
|  | Vulcanizing Accelerator | 0.8 | 0.8 | 0.8 | 0.8 | 0.8 | 0.8 |
|  | Vulcanizing Accelerator | 1 | 1 | 1.5 | 1.5 | 1.5 | 1.5 |
|  | Sulfur | 1 | 1 | 1 | 1 | 1 | 1 |
|  | Blowing Agent: |  |  |  |  |  |  |
|  | DPT | 0 | 0 | 0 | 0 | 0 | 0 |
|  | ADCA | 6 | 6 | 4.55 | 4.55 | 4.55 | 4.55 |
|  | Blowing Auxiliary |  |  |  |  |  |  |
|  | A | 3.4 | 3.4 | 1 | 1 | 1 | 1 |
|  | B | 3.4 | 3.4 | 14 | 1.4 | 1.4 | 1.4 |
|  | C | 0 | 0 | 0 | 0 | 0 | 0 |
|  | Elongated Resin | 0 | 6 | 0 | 0.5 | 2 | 15 |
| Elongated Resin | Type (Name) | — | PE | — | PP | PP | PP |
|  | Melting Point (*1) | — | 135 | — | 167 | 167 | 167 |
|  | Diameter μm | — | 23 | — | 14 | 30 | 136 |
|  | Length mm | — | 0.5 | — | 0.5 | 0.5 | 0.5 |
|  | Viscosity (*2) @ 175° C. | — | 6 | — | 4 | 4 | 4 |
|  | Viscosity (*2) @ 110° C. | — | 120 | — | 130 | 130 | 130 |
| Rubber Matrix (Unvulcanized) | Viscosity Minimum Value @ 175° C. | 11 | 11 | 11 | 11 | 11 | 11 |
|  | Viscosity Minimum Value @ 110° C. | 14 | 14 | 14 | 14 | 14 | 14 |
| Vulcanized Rubber Composition | Overall Foaming Ratio % | 40 | 40 | 25 | 25 | 25 | 25 |
|  | Volume Ratio between First: Second Closed Cells | 100:0 | 38:62 | 100:0 | 80:20 | 80:20 | 90:10 |
|  | Hardness (Degree) | 46 | 48 | 50 | 51 | 52 | 57 |
| First Closed Cell | Shape | spherical | spherical | spherical | spherical | spherical | spherical |
|  | Average Diameter (μm) |  |  |  |  |  |  |
| Second Closed Cell (with Protective Layer) | Shape | — | elongated | — | elongated | elongated | elongated |
|  | Average Hollow Diameter: D (μm) | — | 136 | — | 80 | 80 | 80 |
|  | L/D | — | 4 | — | 6 | 6 | 6 |
|  | Thickness of Protective Layer: t (μm) | — | 4.2 | — | 1.1 | 4.7 | 48.0 |
| Mixing Workability | Dispersibility of Elongated Resin | — | ○ | — | ○ | ○ | ○ |
| Performance of Tire | Ice Gripping Ability | 100 | 105 | 100 | 106 | 125 | 105 |
| Cracking durability at Bottom of Groove After Car Driving 20,000 km |  | ○ | ○ | ○ | ○ | ○ | ○ |

Silane coupling agent: bis(3-triethoxysilylpropyl)-tetrasulfide
[(C$_2$H$_5$O)$_3$SiC$_3$H$_6$]$_2$S$_4$
Comp. Ex. = Comparative Example
Ex. = Example

What is claimed is:

1. A pneumatic tire in which a belt layer and a tread rubber are disposed at an outer circumference of a crown portion of a carcass layer which extends over a pair of bead cores and is formed in a toroidal shape, wherein:
    said tread rubber including a multiplicity of elongated closed cells dispersed throughout said tread rubber, said elongated closed cells coated by a protective layer formed by a resin, and wherein each of said cells is closed entirely by said protective layer, said elongated closed cells having a maximum length L and an average hollow diameter D, wherein L/D≧3.

2. A pneumatic tire according to claim 1, wherein said elongated closed cell is oriented along the circumferential direction of the tire.

3. A pneumatic tire according to claims 1, wherein the average hollow diameter of said elongated closed cell is more than or equal to 20 μm and less than or equal to 500 μm.

4. A pneumatic tire according to claim 1, wherein the average thickness of said protective layer is more than or equal to 0.5 μm and less than or equal to 50 μm.

5. A pneumatic tire according to claim 1, wherein the average foaming ratio of said tread rubber is 3 to 40%.

6. A pneumatic tire according to claim 1, wherein L/D≧10.

7. A pneumatic tire in which a belt layer and a tread rubber are disposed at an outer circumference of a crown portion of a carcass layer which extends over a pair of bead cores and is formed in a toroidal shape, wherein:

before vulcanization of the tire, said tread rubber includes at least an elongated resin and a blowing agent which generates a gas, and during the vulcanization process of the tire, as at least a portion of the gas generated by said blowing agent is concentrated on said resin and said resin has a viscosity that is lower than the viscosity of a rubber matrix, said tread rubber has a multiplicity of elongated closed cells dispersed throughout said tread rubber, each of said elongated closed cells coated by a protective layer formed by said resin, said elongated closed cells having a maximum length L and an average hollow diameter D, wherein $L/D \geq 3$.

8. A pneumatic tire according to claim 7, wherein the melting temperature of said resin is less than or equal to a maximum vulcanizing temperature.

9. A pneumatic tire according to claim 7, wherein the melting temperature of said resin is less than 190° C.

10. A pneumatic tire according to claim 7, wherein $L/D \geq 10$.

11. A method of manufacturing a pneumatic tire, in which a raw tread rubber includes a blowing agent, which generates gas during vulcanization of a tire, and an elongated resin, wherein the raw tread rubber is melted or softened during vulcanization so that the viscosity of the elongated resin is lower than the viscosity of a rubber matrix, said method comprising:

adhering, the raw tread rubber to a crown portion of a raw tire casing, and thereafter, vulcanizing the raw tire casing, to which the raw tread rubber is adhered, in a predetermined mold, wherein by the time a maximum vulcanizing temperature is reached, the viscosity of the elongated resin decreases to lower than the viscosity of the rubber matrix, and the gas is generated by the blowing agent, and due to at least a portion of the gas being concentrated on the interior of the elongated resin whose viscosity is lowered, a multiplicity of elongated closed cells each of whose outer circumferential portions has a protective layer formed by the resin is formed within the tread rubber, said elongated closed cells having a maximum length L and an average hollow diameter D, wherein $L/D \geq 3$.

12. A method of manufacturing a pneumatic tire according to claim 11, wherein the melting point of said resin is less than or equal to the maximum vulcanizing temperature.

13. A method according to claim 11, wherein $L/D \geq 10$.

14. A vulcanized rubber composition made from a rubber composition including elongated resin and blowing agent which generates gas during vulcanization of a tire, wherein:

the viscosity of said elongated resin is lower than the viscosity of the rubber matrix by the time in which the rubber composition reaches a maximum vulcanizing temperature, such that, after vulcanization, said vulcanized rubber composition comprises a multiplicity of elongated closed cells each with a protective layer formed by said resin and dispersed in said vulcanized rubber composition, said elongated closed cells having a maximum length L and an average hollow diameter D, wherein $L/D \geq 3$.

15. A vulcanized rubber composition according to claim 14, wherein the melting point of said elongated resin is less than a maximum vulcanizing temperature.

16. A vulcanized rubber composition according to claim 14, wherein the melting temperature of said elongated resin is less than 190° C.

17. A vulcanized rubber composition according to claim 14, wherein said elongated resin is mixed with the rubber composition so that the amount of said elongated resin is 0.5 to 30 parts by weight based on 100 parts by weight of the rubber.

18. A vulcanized rubber according to claim 14, wherein said elongated resin is any one of polyethylene, polypropylene, and a blend of polyethylene and polypropylene.

19. A vulcanized rubber composition according to claim 14, wherein the longitudinal direction of said elongated resin is disposed along one direction.

20. A vulcanized rubber composition according to claim 14, wherein said rubber composition includes at least one type of rubber which is selected from a group of natural rubber and diene-type synthetic rubber.

21. A vulcanized rubber composition which includes a rubber composition including elongated resin and blowing agent which generates gas during vulcanization of a tire, wherein:

the viscosity of said elongated resin is lower than the viscosity of the rubber matrix by the time in which the rubber composition reaches a maximum vulcanizing temperature, and after vulcanization, said rubber composition comprises a multiplicity of elongated closed cells each with a protective layer formed by said resin and dispersed in said vulcanized composition, and said elongated closed cells have an outer portion reinforced by a protective layer formed by a resin, and 10% or more of the overall foaming volume of a rubber is occupied by the foaming of said elongated closed cell, and said elongated closed cells having a maximum length L and an average hollow diameter D, wherein $L/D \geq 3$.

22. A vulcanized rubber composition according to claim 21, wherein the average hollow diameter of said elongated closed cell is more than or equal to 20 μm and less than or equal to 500 μm.

23. A vulcanized rubber composition according to claim 21, wherein the average thickness of said protective layer is more than or equal to 0.5 μm and less than or equal to 50 μm.

24. A vulcanized rubber composition according to claim 21, wherein an average foaming ratio is 3 to 40%.

25. A vulcanized rubber composition according to claim 21, wherein $L/D \geq 10$.

26. A vulcanized rubber composition which includes a rubber composition including one elongated resin and blowing agent which generates gas during vulcanization of a tire, wherein:

the viscosity of said elongated resin is lower than the viscosity of the rubber matrix by the time in which rubber composition reaches a maximum vulcanizing temperature, and after vulcanization, said rubber composition comprises a multiplicity of elongated closed cells each with a protective layer formed by said resin and dispersed in said vulcanized rubber composition, and wherein:

the vulcanized rubber composition includes a spherical closed cell which is substantially spherical and an elongated closed cell whose outer circumferential portion is reinforced by a protective layer formed by a resin, and the average hollow diameter of said elongated closed cell is more than or equal to 20 μm and less than or equal to 500 μm, and said elongated closed cell having a maximum length L and an average hollow diameter D, wherein $L/D \geq 3$.

27. A vulcanized rubber composition according to claim 26, wherein the average thickness of said protective layer is more than or equal to 0.5 μm and less than or equal to 50 μm.

28. A vulcanized rubber composition according to claim 26, wherein a total average foaming ratio, which is an average foaming ratio of a plurality of said spherical closed cells plus an average foaming ratio of a plurality of said elongated closed cells is 3 to 40%.

29. A vulcanized rubber composition according to claim 28, wherein the average foaming ratio of said elongated closed cells is 3 to 40%.

30. A vulcanized rubber composition according to claim 26, wherein $L/D \geqq 10$.

* * * * *